United States Patent [19]
Koehler et al.

[11] 3,862,998
[45] Jan. 28, 1975

[54] MIXTURE OF A POLYCARBONATE AND A STYRENE MALEIC ACID ANHYDRIDE COPOLYMER

[75] Inventors: Michael Koehler, Vienna, Austria; Salah Elabd Elghani, Cologne; Richard Prinz, Leverkusen, both of Germany

[73] Assignee: Bayer Aktiengesellschaft, Leverkusen, Germany

[22] Filed: Oct. 25, 1973

[21] Appl. No.: 409,409

[30] Foreign Application Priority Data
Oct. 28, 1972  Germany............................ 2252974

[52] U.S. Cl. ................................................ 260/873
[51] Int. Cl. ....................... C08g 39/10, C08f 41/12
[58] Field of Search........... 260/47 XA, 873, 93.5 A

[56] References Cited
UNITED STATES PATENTS

| | | | |
|---|---|---|---|
| 3,239,582 | 3/1966 | Keskula et al. | 260/47 X |
| 3,462,515 | 8/1969 | Cantrill | 260/47 X |
| 3,642,946 | 2/1972 | Grabowski | 260/873 |

*Primary Examiner*—Melvin Goldstein
*Assistant Examiner*—T. Pertilla
*Attorney, Agent, or Firm*—Connolly and Hutz

[57] ABSTRACT

Thermoplastic moulding compositions and shaped articles made therefrom of mixtures of
  a. 5 to 95 percent by weight of a polycarbonate of divalent phenols and
  b. 95 to 5 percent by weight of a styrene/maleic acid anhydride copolymer having improved stability to boiling water and improved flow properties.

5 Claims, 1 Drawing Figure

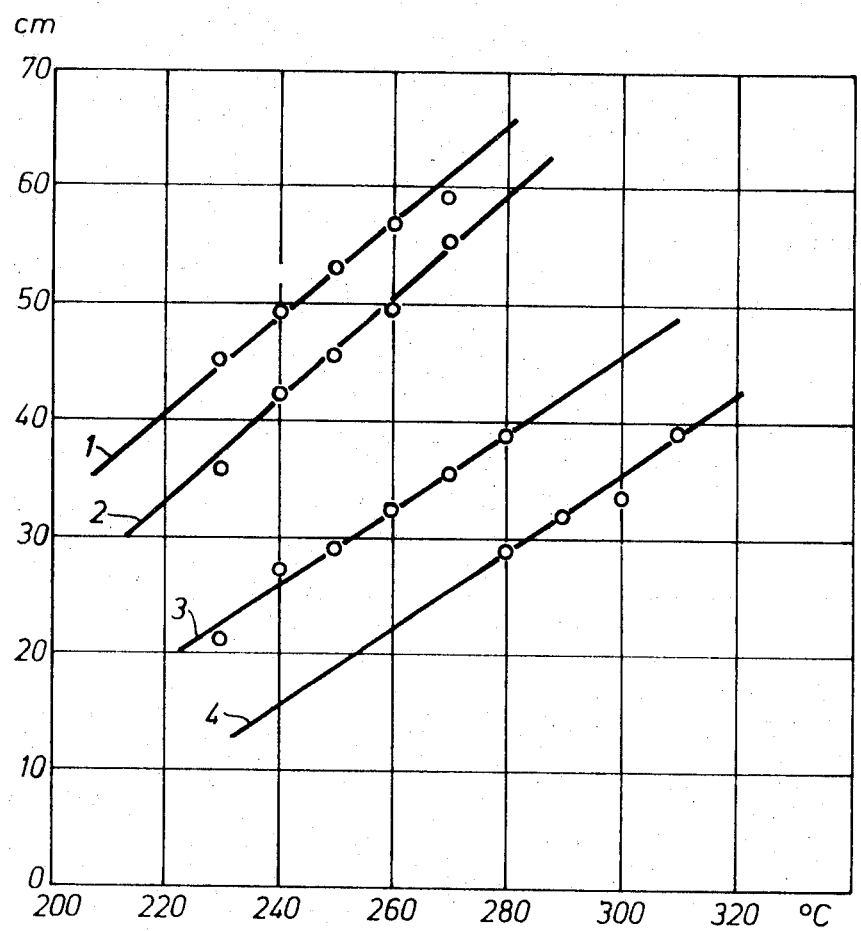

MIXTURE OF A POLYCARBONATE AND A STYRENE MALEIC ACID ANHYDRIDE COPOLYMER

This invention relates to a thermoplastic moulding compound comprising a mixture of polycarbonates of divalent phenols and styrene/maleic acid anhydride copolymers.

It is known that the properties of polycarbonates, for example their thermoplasticity, can be modified by the addition of other polymers, but an improvement in one property, e.g. the melt index, is accompanied by a deterioration in other properties (tensile strength, light fastness and resistance to weathering). Polycarbonates have excellent thermal and mechanical properties, but low stability to boiling water; an improvement in their flow characteristics would also be desirable.

This invention relates to thermoplastic moulding compositions which comprise or consist of mixtures of a. 5 to 95 percent by weight of a polycarbonate of divalent phenols and
b. 95 to 5 percent by weight of a styrene/maleic acid anhydride copolymer.

These moulding compounds have a much greater stability to hot water as compared to polycarbonates and are substantially improved in their flow properties. Their mechanical properties are partly improved over those of polycarbonates. The high transparency of polycarbonates is preserved in the mixtures. When a solution of a styrene/maleic acid anhydride copolymer in methylene chloride is added to a polycarbonate solution in the same solvent, neither cloudiness nor phase separation is observed. These properties of mixtures of styrene/maleic acid anhydride copolymers and polycarbonates are very surprising as polystyrene and polycarbonate are incompatible, i.e. they form cloudy mixtures with poor mechanical properties.

The stability of polycarbonates to hot water is increased by the addition of styrene/maleic acid anhydride copolymers. When 10 standard test bars made from a mixture of 20 parts by weight of styrene/maleic acid anhydride copolymer and 80 parts by weight of polycarbonate are kept in boiling water for 1,000 hours, only one bar breaks in the impact strength test according to DIN 53 453 whereas when test bars produced from pure polycarbonate are subjected to the same conditions, four of the bars break (the following were used for comparison: A polycarbonate of 4,4'-dihydroxy-diphenyl-propane-(2,2) having a relative viscosity of 1.28 determined on a solution of 0.5 g of polycarbonate in 100 ml of methylene chloride; a styrene/maleic acid anhydride copolymer, molar ratio approximately 88 : 12, having a relative viscosity of 1.49 determined on a solution of 0.5 g of copolymer in 100 ml of methylene chloride). Mixtures of styrene/maleic acid copolymer and polycarbonate show an improvement in flow. FIG. 1 shows the flow curves of several mixtures compared with that of an easily flowing polycarbonate.

In FIG. 1 the abscissa indicates the temperature in °C at which the flow of the polymer or polymer mixture was determined. The polymer or polymer mixture was injection moulded into a die of a bar having a rectangular cross-section of 2 × 20 mm. The die is constructed so that the polymer is introduced in its centre and the bar has the shape of a flat spiral. The length of the bar of polymer obtained (actually it is wound up as a flat spiral) in cm is indicative of the flow properties. This length is given in the ordinate of FIG. 1.

The graphs in FIG. 1 show flow properties of various polymer mixtures as follows:

Graph 1: mixture of 20 percent by weight of a low flow polycarbonate ($\eta_{rel} = 1.32$) and 80 percent by weight of a styrene maleic acid anhydride copolymer. (closer defined in Example 1)

Graph 2: mixture of 50 percent by weight of the same polycarbonate and 50 percent by weight of the same styrene maleic acid anhydride copolymer.

Graph 3: Mixture of 80 percent by weight of the same polycarbonate and 20 percent by weight of the same styrene maleic acid anhydride.

Graph 4: pure polycarbonate, this polycarbonate is different from the polycarbonate in graphs 1 to 3, a material having very good flow properties ($\eta_{rel}=1.24$) was selected.

The graphs thus show that the flow properties of a polycarbonate having very good flow properties as far as polycarbonates are concerned is much inferior to mixtures of polycarbonates showing low flow and styrene maleic anhydride copolymers.

Suitable polycarbonates for the mixtures are: high-molecular weight thermoplastic polycarbonates prepared from divalent phenols, e.g. hydroquinone, resorcinol, 4,4'-dihydroxy-diphenyl, bis-(4-hydroxyphenyl)-alkanes, -cycloalkanes, -ethers, -sulphides,-sulphones, and -ketones;bisphenols which are halogenated or alkylated in the nucleus; and $\alpha$, $\alpha'$-bis-(p-hydroxyphenyl)-p-diisopropyl benzene. Polycarbonates based on 4,4'-dihydroxy-diphenylpropane-(2,2) (bisphenol A), tetrachlorobisphenol A, tetrabromobisphenol A, tetramethylbisphenol A and trinuclear bisphenols such as $\alpha,\alpha'$-bis(4-hydroxyphenyl-p-diisopropyl)benzene are preferred. They are prepared in known manner by reacting the divalent phenols with a derivative of carbonic acid which forms a polycarbonate.

The molecular weight range of the polycarbonates used is preferably from 10,000 to 100,000, most preferably from 20,000 to 60,000, corresponding to a relative viscosity of 1.20 to 1.60 determined on a solution of 0.5 g of polycarbonate in 100 ml of methylene chloride at 25°C.

The proportions of the two components in the styrene/maleic acid anhydride copolymers may vary within wide limits as may also the molecular weight. The styrene/maleic acid anhydride copolymer can generally be prepared by reacting maleic acaid anhydride with styrene at an elevated temperature in the presence of a peroxide catalyst (see U.S. Pat. Nos. 2,866,771 and 2,971,939). The copolymers may also contain $\alpha$-methyl styrene, vinyl toluene, 2,4-dimethyl styrene, chlorostyrene and other substituted styrenes instead of styrene itself. The molecular weight of the styrene/maleic acid anhydride copolymers may vary over a wide range, e.g. preferably from 2,000 to 300,000 and most preferably within the range of about 80,000 to about 200,000. The styrene/maleic acid anhydride copolymer preferably contains between 5 and 50 percent by weight of maleic acid anhydride, more preferably 5 to 30 percent, most preferably 8 – 15 percent. The moulding compounds of this invention can be obtained, for example, by mixing solutions of the two polymer components in a suitable solvent or solvent mixture. Additives such as dyes, stabilisers or substances used to achieve special effects may be incorporated in these solutions.

The moulding compositions can then be isolated from these solutions by precipitation with non-solvents or by evaporation of the solvents. Suitable solvents are, for example, chlorinated, aliphatic hydrocarbons such as methylene chloride, chloroform and trichloroethane, and halogenated aromatic solvents such as chlorobenzene. The non-solvents used are preferably alcohols such as methanol, ethanol and isopropanol.

Another method of preparing the moulding compositions of this invention comprises mixing the polymer components in extruders equipped with mixing devices. When such extruders are used, the components may either all be melted together or the separate melts of the components may be added together, mixed and extruded.

The novel moulding compounds are used for making shaped articles, e.g. films and threads which are to be subjected to prolonged exposure to boiling water. The moulding compounds may also be used wherever flow properties better than those of polycarbonates are required or wherever styrene/maleic acid anhydride copolymers with impact strength, notched impact strength and resistance to continuous heat are required.

Parts in the following examples are by weight and relative viscosities throughout this specification are determined on solutions in methylene chloride (0.5 g of substance in 100 ml of methylene chloride) at 25°C.

Preparation of a polycarbonate 454 parts of 4,4'-dihydroxy-diphenyl-2,2-propane (bisphenol A) and 9.5 parts of p-tertiary-butyl-phenol were suspended in 1.5 litres of water. The oxygen was removed from the mixture in a three-necked flask equipped with a stirrer and a gas inlet tube by introducing nitrogen for 15 minutes with stirring. 355 parts of a 45 percent sodium hydroxide solution and 1,000 parts of methylene chloride were then added. The mixture was cooled to about 25°C. This temperature was maintained by cooling while 237 parts of phosgene were added over a period of 2 hours. 15 – 30 minutes after the beginning of introduction of phosgene, 75 parts of a 45 percent sodium hydroxide solution were added. 1.6 parts of triethylamine were added to the resulting solution and stirring was then continued for a further 15 minutes. A highly viscous solution was obtained, the viscosity of which was reduced by the addition of methylene chloride. The organic phase was then separated from the aqueous phase and washed with water until the water was free from salts and alkali. The polycarbonate was isolated from the washed solution and dried. It had a relative viscosity of 1.32 determined on a 0.5 percent solution in methylene chloride at 20°C, which corresponds approximately to a molecular weight of 34,000.

EXAMPLE 1

80 parts of a polycarbonate of 4,4'-dihydroxy-diphenylpropane-(2,2) having a relative viscosity of 1.33 and 20 parts of a copolymer of 89 parts of styrene and 11 parts of maleic acid anhydride having a relative viscosity of 1.49 were mixed in a double screw extruder at 200°C, 220°C, 250°C and 235°C and extruded. Shaped articles made from this mixture are distinguished from articles made from pure polycarbonate by their improved stability to boiling water, which is shown as follows:

10 standard test bars were stored in boiling water for 1,000 hours. In the impact strength test according to DIN 53 453, only one of the 10 bars breaks while 4 of the 10 reference polycarbonate test bars break.

The flow properties of the mixture were improved compared with that of pure polycarbonate. The mechanical properties of this moulding composition and those of the following examples are shown in Table 1.

EXAMPLE 2

80 parts of a polycarbonate of 4,4'-dihydroxy-diphenylpropane-(2,2) having a relative viscosity of 1.28 and 20 parts of the styrene/maleic acid anhydride copolymer described in Example 1 are mixed in a double screw extruder at 200°C, 220°C, 250°C and 235°C and extruded. The stability of the product to boiling water is similar to that in Example 1. The flow properties of the mixture were even better than that in Example 1.

EXAMPLE 3

50 parts of the polycarbonate used in Example 1 and 50 parts of the styrene/maleic acid anhydride copolymer described in Example 1 are mixed in a double screw extruder at 200°C, 220°C, 250°C and 235°C and extruded. The stability of the product to boiling water is similar to that obtained in Example 2. The flow properties of the mixture were even better than in Example 2.

EXAMPLE 4

20 parts of the polycarbonate used in Example 1 and 80 parts of the styrene/maleic acid anhydride copolymer described in Example 1 are mixed in a double screw extruder at 200°C, 220°C, 250°C and 235°C and extruded. The impact strength of the product is practically unchanged after 1,000 hours in boiling water. The flow properties of the mixture were even better than in Example 3.

Table 1

| property: | test-method: | unit of measure: | Example 1: | Example 2: | Example 3: | Example 4: |
| --- | --- | --- | --- | --- | --- | --- |
| impact strength | DIN 53453 | cmkp/cm$^2$ | | | | |
| + 20°C | | | not broken | not broken | not broken | 21 |
| − 40°C | | | not broken | 82 | 45 | 21 |
| notched impact strength | DIN 53 453 | cmkp/cm$^2$ | | | | |
| + 20°C | | | 17 | 16 | 19 | 4 |
| − 40°C | | | | 7 | | |
| tensile strength | DIN 53455 | kp/cm$^2$ | 568 | 575 | 642 | |

Table 1 — Continued

| property: | test-method: | unit of measure: | Example 1: | Example 2: | Example 3: | Example 4: |
|---|---|---|---|---|---|---|
| G 1.0 elongation | DIN 53455 | % | 3.3 | 3.3 | 3.3 | |
| G 1.0 modulus of elasticity | DIN 53455 | kp/cm$^2$ | 25.500 | 25.000 | 29.000 | 32.500 |
| ball indentation hardness H$_{c\ 30\ sec.}$ | DIN 53456 | kp/cm$^2$ | 1.220 | 1.200 | 1.400 | 1.685 |
| heat distortion temperature according to Vicat (B) | DIN 53460 | °C | 144 | 143 | 134 | 126 |

I claim:

1. A thermoplastic moulding composition consisting essentially of a mixture of (a) from 5–95 percent by weight of a polycarbonate of a dihydric phenol and a derivative of carbonic acid (b) from 95 to 5 percent by weight of a copolymer of styrene and maleic acid anhydride containing from 5 to 50 percent by weight of maleic acid anhydride.

2. A moulding composition as claimed in claim 1 in which the polycarbonate is based on bisphenol A, tetrachlorobisphenol A, tetrabromobisphenol A, tetramethylbisphenol A or a trinuclear bisphenol.

3. A composition as claimed in claim 1 in which the polycarbonate has a molecular weight of from 10,000 to 100,000.

4. A composition as claimed in claim 1 in which said copolymer has a molecular weight of from 2,000 to 300,000.

5. A composition as claimed in claim 4 in which the copolymer has a molecular weight of from 80,000 to 200,000.

* * * * *